United States Patent [19]

Cuschleg, Jr. et al.

[11] Patent Number: 4,953,204
[45] Date of Patent: Aug. 28, 1990

[54] MULTILOCATION QUEUING FOR TELEPHONE CALLS

[75] Inventors: Robert F. Cuschleg, Jr., Columbus, Ohio; Brian D. Freeman, Howell; Kevin B. Kelly, Neptune; Philip J. Patti, Belle Mead; Anthony J. Perinelli, Woodbridge; Amy K. Shannon, Aberdeen, all of N.J.

[73] Assignee: AT&T Bell Laboratories, Murray Hill, N.J.

[21] Appl. No.: 422,852

[22] Filed: Oct. 17, 1989

[51] Int. Cl.⁵ .......................... H04Q 3/64; H04M 3/42
[52] U.S. Cl. .................................... 379/266; 379/309; 379/374
[58] Field of Search ............... 379/113, 215, 372, 374, 379/214, 246, 266, 309

[56] References Cited

U.S. PATENT DOCUMENTS

| | | | |
|---|---|---|---|
| 2,922,847 | 1/1960 | Dunning | 179/27 |
| 3,297,829 | 1/1967 | Germanton | 179/27 |
| 4,048,452 | 9/1977 | Oehring et al. | 179/27 |
| 4,757,267 | 7/1988 | Riskin | 379/113 |

Primary Examiner—Stafford D. Schreyer
Attorney, Agent, or Firm—Werner Ulrich

[57] ABSTRACT

This invention relates to methods and apparatus for queuing calls to a multilocation service provider having a plurality of automatic call distributors (ACDs). If all circuits to the ACDs are unavailable, a call is queued in one of a plurality of queues. One or more of these queues will allow call completion to any ACD of the service provider as soon as an agent of that ACD becomes available. Advantageously, the average waiting time for customers to that service provider is reduced, thereby improving service. In accordance with one feature of the system, the caller can select one of a plurality of choices of music on hold as offered by the service provider.

23 Claims, 6 Drawing Sheets

| DESTINATION | MCA | CIP |
|---|---|---|
| NJ | 10 | 10 |
| NY | 5 | 5 |
| IL | 4 | 4 |
| CA | 7 | 7 |

200

| DESTINATION | PRIORITY QUEUE | REGULAR QUEUE |
|---|---|---|
| NJ | X | Y |
| NY | X | Y |
| IL | X | Z |
| CA | X | Z |

225

| QUEUE ID | MCQ | CIQ | TYPE | DESTINATION |
|---|---|---|---|---|
| X | 5 | 3 | P | NJ,NY,IL,CA |
| Y | 8 | 3 | R | NJ,NY |
| Z | 4 | 3 | R | IL,CA |

220

PRIORITY QUEUE X (210)
- CALL 2
- CALL 3
- CALL 4

REGULAR QUEUE Y (215)
- CALL 5
- CALL 6
- CALL 7

REGULAR QUEUE Z (217)
- CALL 8
- CALL 9
- CALL 10

| CALL ORIGIN/TYPE | SEQUENCE ID |
|---|---|
| ⋮ | ⋮ |

230

| SEQUENCE ID | SEQUENCE |
|---|---|
| ⋮ | ⋮ |

240

250

| DIALED NUMBER | |
|---|---|
| DIGIT VALUE | "MUSIC" ROUTE |
| ⋮ | ⋮ |

⋮

| DIALED NUMBER | |
|---|---|
| DIGIT VALUE | "MUSIC" ROUTE |
| ⋮ | ⋮ |

MULTILOCATION QUEUING FOR TELEPHONE CALLS

TECHNICAL FIELD

This invention relates to the completion of telecommunication calls to agent positions of customers having multilocation or multiteam groups of agent positions.

PROBLEM

In recent years there has been a substantial increase in the volume of telephone calls to large customers including large customers having a plurality of agent teams, frequently for serving a plurality of establishments at different locations. For example, telemarketing of products advertised nationally on television generates a large number of calls throughout the country that are handled by the business customer at a number of regional offices. Each of these regional offices typically has a large automatic call distributor (ACD), accessed via circuits, wherein there are frequently more circuits than agents, and the calls to the excess circuits are queued in the ACD. In addition, there are also smaller businesses with perhaps one headquarters location and a number of supplementary sites which would like to serve overflow traffic to the major location at the supplementary sites if agents are available there. In some prior art systems, a call is directed to a single location. If no agents are available at that location, the call is either queued if queuing facilities are available for that ACD, or the customers are simply given a busy signal. In one prior art system, customers can be automatically routed to other teams if no agents are available at the preferred ACD, but if the other teams are also busy, the call is queued only for the preferred ACD. These arrangements avoid the necessity for providing that business with an excess number of circuits for handling queued as well as active calls.

A problem in the prior art is that these kinds of arrangements still give busy signals or excessively long queuing delay to many callers.

SOLUTION

The above problem is solved and an advance is made over the prior art in accordance with the principles of this invention wherein a first system is used to allocate calls to the different service teams of a multi-team customer, wherein this system keeps track of the number of available circuits to each team and has a queue for storing calls when no circuits are available to any of a plurality of customer teams; calls are routed to the first available circuit to any of a plurality of teams in at least two geographically separated locations served by different communications switching systems, rather than the first available circuit to a particular team. The teams are each typically served by an automatic call distributor.

Queuing theory has shown that a multi-queue/multi-server (one queue per team) approach leads to a larger average waiting time than a single queue/multi-server approach (one queue for a plurality of teams). A flexible arrangement of queues is made possible according to this invention. A first plurality of teams comprises the teams to which a particular call may be routed if any circuit to any of these teams is available; a second plurality comprises the teams to which calls in a particular queue may be routed if a circuit in one of these teams becomes available. For a particular call, as identified by the geographic origin, the dialed number, and, in some cases, additional data supplied by the caller after dialing, the first plurality and second plurality may be different and need not include all the teams of the customer. Advantageously, this arrangement allows any available agent from a plurality of teams to serve a queued call and thereby reduces the average wait of callers in a queue. Advantageously, such an arrangement makes queuing in the network more attractive, because queued calls are given access to more agents.

In accordance with one specific embodiment of the invention, a database is used to control the routing of the calls. In this database is maintained, for each team of each customer, a count of the number of circuits to that team and a number of the calls in progress to that team. The number of calls that may be accepted is limited by the number of circuits connecting a switching system to the ACD. Therefore, the number of calls that may be accepted includes both the number of active agent positions and the number of calls that may be queued by the ACD. In order to minimize call charges, there is a preference to route calls to the regional office closest to the caller and to use other destinations in a sequence which includes progressively longer distances. Finally, the sequence specifies the queue, if any, in which calls may be queued while awaiting availability of a connection to an ACD. If the number of calls in progress is less than the number of circuits available to the preferred team, the call is simply routed to the preferred team; otherwise other teams are tried in the sequence. If, for all teams in the sequence the number of calls in progress equals the maximum of calls allowed, then the call is entered into a queue for serving calls to some or all of the teams of that customer. Each time a circuit becomes available, the queue is checked to see if there are any calls stored in the queue. If so, the oldest call in the queue is routed to that circuit. If not, the number of calls in progress for the team connected by that circuit is simply decreased. Advantageously, any call which cannot be served by a team with a currently available circuit, can be placed in a queue for reaching a prespecified plurality of teams.

The sequence is a function of either the place of origin, such as the area code of the caller, the specific directory number, out of a plurality of such numbers, dialed by the caller; or the type of call as specified by information supplied by the customer. The latter specification is performed, for example, through call prompter arrangements, wherein a customer keys a digit to specify, for example, whether the customer wants to place an order or to make a billing inquiry.

In one specific embodiment of the invention, a table is used to translate between the call origin/call type and a sequence identifier, and a second table is used to translate between the sequence identifier and the specific sequence of teams which should be checked, in order to complete the call as economically as possible, and the queue which should be used if the call cannot be completed now.

In accordance with one aspect of the invention, a sequence identifier need not specify all customer teams. Thus, it is possible for a customer to arrange that only certain types of calls, for example calls to place an order, will be completed to any of the teams and will be placed in the queue while permitting other calls such as billing inquiries only to be completed to the nearest one or two regional offices.

In accordance with another aspect of this invention, several call origin/type tables may exist for a particular customer and the choice among these tables may be made according to the directory number dialed by the customer. This would allow billing inquiries to be treated differently from calls to place orders. It is possible to specify the sequence based only on the place of origin, only on the call type, or on a combination of the two.

In accordance with one aspect of the invention, if the caller is forced to wait for an available circuit, the caller is connected to a source of music selected by the caller. The selection may be pre-stored for the caller, or may be selected, on the basis, illustratively, of keyed digits, from among a repertory of music offered by the customer. Advantageously, the caller can receive the type of music, including silence, that the caller prefers while awaiting an available circuit.

DETAILED DESCRIPTION

Figure 1:
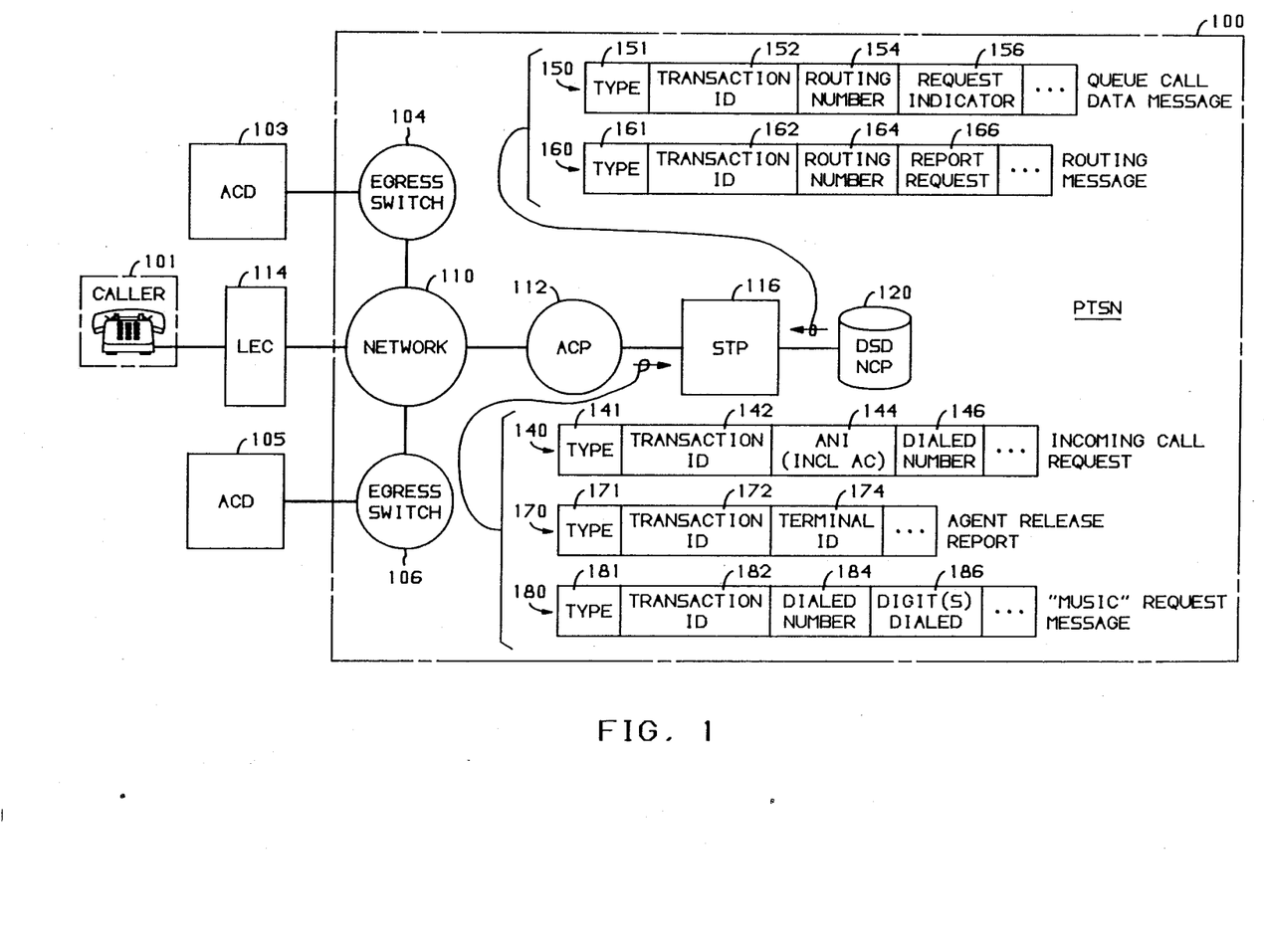
FIG. 1 is a block diagram of a network and the routing messages that are exchanged within the network.

FIG. 1 is a diagram of a system used for implementing the present invention. A caller 101 places a call to a customer having a number of automatic call distributors of which two, ACD 103 and ACD 105, are shown in the diagram. The caller is connected via a local exchange carrier network 114 to a toll switch 112 that is equipped as an action control point for providing services including 800 service (INWATS) with multi-location queuing. ACDs 103 and 105 are connected to the public toll switched network (PTSN) 100 at egress switches 104 and 106, respectively. One such PTSN is the AT&T switched network. Network 110 within PTSN 100 interconnects action control point (ACP) 112, egress switches 104 and 106, and other egress switches (not shown) for accessing other ACDs of the customer.

Figure 3:
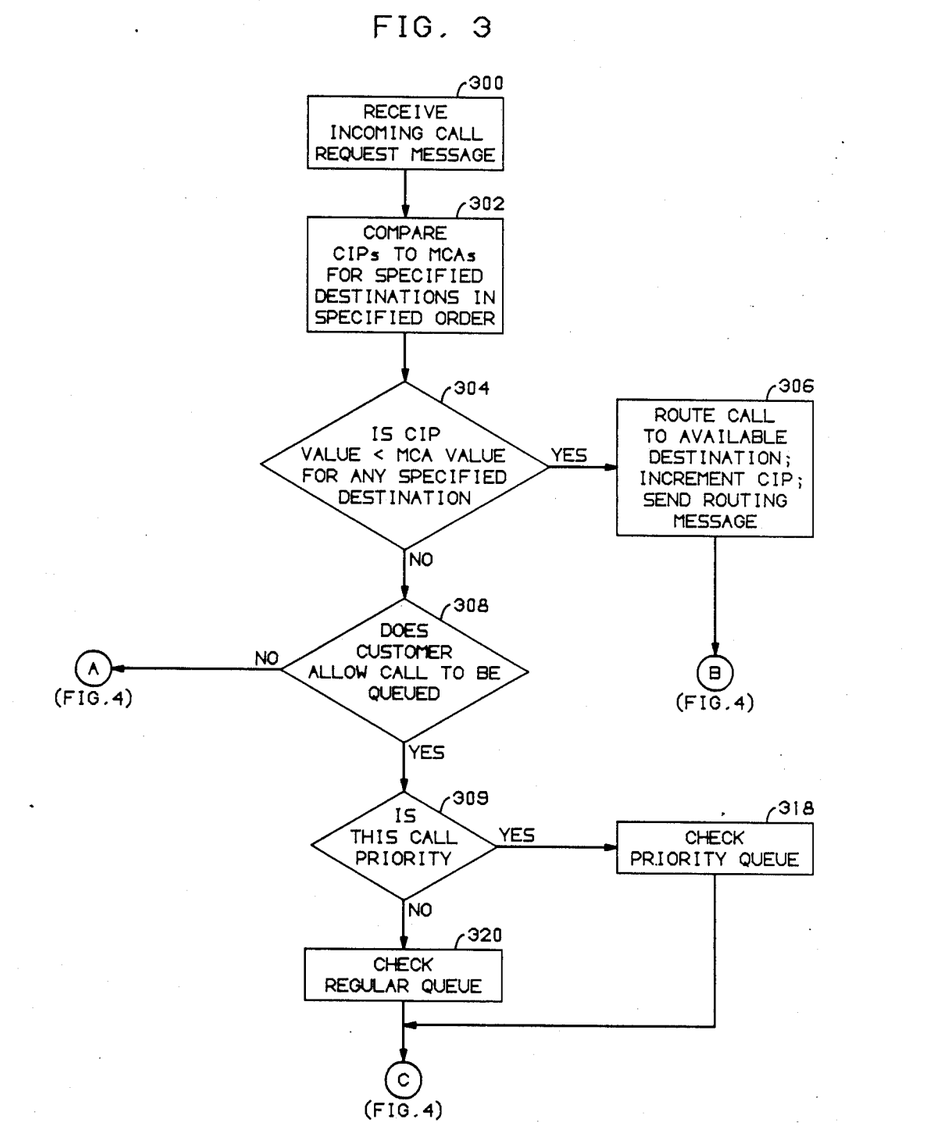
FIGS. 3-6 are flow diagrams of programs executed in the database system for routing calls.

When a call from caller 101 for the customer comes into PTSN 100, ACP 112 needs routing information from a direct services dialing network control point (DSD/NCP) 120. The features of this invention are implemented in DSD/NCP 120. When ACP 112 has received the call and recognized that it is a call requiring routing directions from DSD/NCP, it sends a routing request message 140 via a signal transfer point 116. In response to message 140, the DSD/NCP executes the program shown in the flowchart of FIG. 3 described hereinafter. As a result of executing this program, the DSD/NCP 120 generates a queue call message 150 if no further calls can be routed to any of the ACDs of the customer and if the caller must therefore be queued at the ACP. Subsequently, if one of the ACDs of the customer has available capacity, or if a call which had previously been queued can now be connected to one of the ACDs, then a routing message 160 is sent to ACP 112. FIG. 3 is a flow diagram of actions performed in response to a request message. Finally, ACP 112 reports any agent releases via message 170 in order to permit the DSD/NCP 120 to connect calls to the ACD of that agent as described in FIG. 4.

The routing request message 140 includes a type field 141 to identify the type of message, a transaction identifier 142 used to keep track of a particular call, the number of the calling customer as identified by automatic number identification 144, or if automatic number identification is not available, then the area code of the calling customer, and finally, the dialed number 146 identifying the customer that was dialed by the caller. The queue call message 150 comprises a type field 151, a transaction identifier 152, which is the same as the transaction identifier 142, a routing number 154 to identify the type of music or other temporary announcement to be connected to the caller while the caller is in the queue, and a "music" request indicator 156. Segment 156 is a request indicator to indicate to the ACP that following an announcement, the caller will be allowed to dial one or more digits to specify a type of music. In response to receiving a queue call data message with a marked request indicator, the ACP 112 will connect a digit receiver to the call to receive the digits and after having received them will transmit to the DSD/NCP 120 a music request message 180. The routing message 160 comprises the type field 161, transaction identifier 162, a routing number 164, identifying the ACD to which the caller is to be connected, and a report request 166 asking the ACP to report when this call is disconnected so that the DSD/NCP 120 can connect another call to that ACD. The release report message 170, sent from ACP 112 to DSD/NCP 120 at the time that an agent releases a call, includes a type field 171, a transaction identifier 172, and a termination identifier to indicate which ACD has had a call terminated.

If, in response to reception by ACP 112 of a queue call data message 150 with a marked request indicator 156, a caller receives an announcement indicating that no agents are available and that the caller will be placed on hold until agents become available, the caller is given a further message giving the caller the option to select the type of music, including no music, for the duration of the hold. In response to this announcement the customer keys an appropriate digit to select the type of music and the ACP sends the DSD/NCP 120 a music request message 180 comprising segments 181, (type) 182 (transaction ID), 184, the number originally dialed by the caller, and 186 representing the digits that the customer has supplied to specify the music request. In response to this music request message, the DSD/NCP returns another queue call data message 150, this time with a routing number 154 representing the routing number for the desired "music". Note that "music" can represent music, silence, jokes, etc. Note further that the ACP 112 may store an indication of the type of music preferred by a customer, or may store a list of possible options keyed to a standard announcement for that switch, thus making a music selection possible without querying the DSD/NCP.

Figure 2:
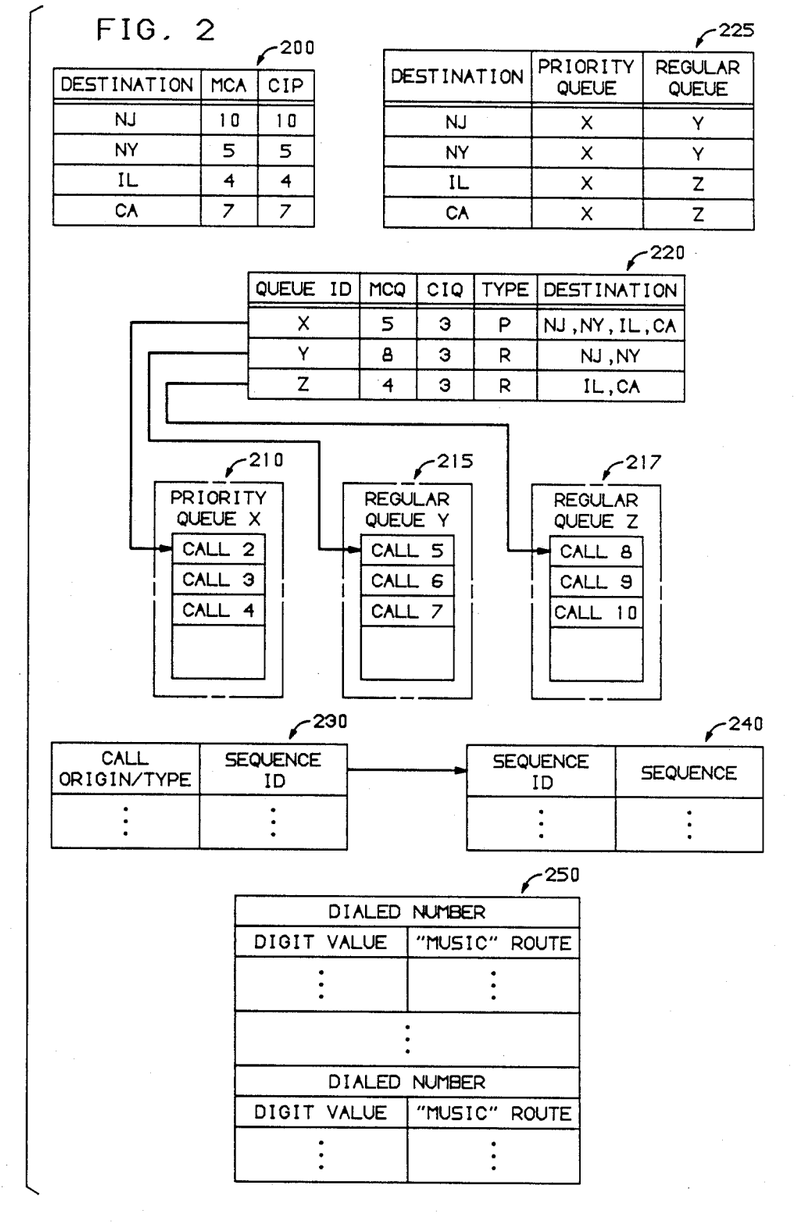
FIG. 2 is a memory layout for a database for routing calls.

FIG. 2 is a chart of the blocks of memory that are required for implementing the present invention. Table 200 is a list of the possible destinations for a call to the number dialed by the caller and, for each such destination, a number representing the maximum number of calls allowed (MCA) to that destination and the number of calls in progress (CIP) to that destination. The maximum number of calls allowed can be changed by the customer according to a pre-specified schedule supplied by the customer. In emergencies, a customer telecommunications manager can also make a change in this parameter. In the particular example shown, in each of the four destinations, one each in New Jersey (NJ), New York (NY), Illinois (IL), and California (CA), the number of calls in progress is equal to the maximum number of calls allowed, and, in fact a priority queue X, 210, has stored three calls, and a regular queue Y, 215 has stored 3 calls and a second regular queue Z, 217, has stored 3 calls. The regular queue Y is used for calls to destinations in NY and NJ, the regular queue Z is used for calls to destinations IL, CA, and the priority queue X is used for all four destinations. A queue control block 220 includes a queue identifier and pointer, an indication of the maximum number of calls that may be placed in the queue and the number of calls currently in the queue, an indication of the type of queue (R=regular, P=priority), and the destinations for which calls are stored in the queue. If the maximum number of calls that may be placed in the queue equals the number of calls in the queue, then any further calls received are routed to a busy signal. Block 225 stores the identification of the priority queue and regular queue for each destination. If, in the example specified, an agent release report is received for the Illinois ACD, then call 2, the oldest call in the priority queue, is connected to the Illinois ACD and cleared from the queue. Destination sequence control tables 230 are used for controlling the sequence of destinations that will be tried for a call, for example, from a given area code. For example, if a call is received from Delaware, then the first choice might be the New Jersey ACD, the second choice, the New York ACD, the third choice, the Illinois ACD, and the fourth choice, the California ACD, and queue 215 would be specified for overflow. Table 230 specifies a sequence identifier, translated in table 240 to the sequence of the ordered destinations and queue(s) to be tried for a particular sequence identifier. Block 250 is used to translate from the number originally dialed by the caller and the additional digit(s) dialed by the customer to specify the type of music on hold, into a route for accessing that music. The route may be an identification of equipment available at ACP 112 or may be a route to another switch for supplying the requested music.

Figure 4:
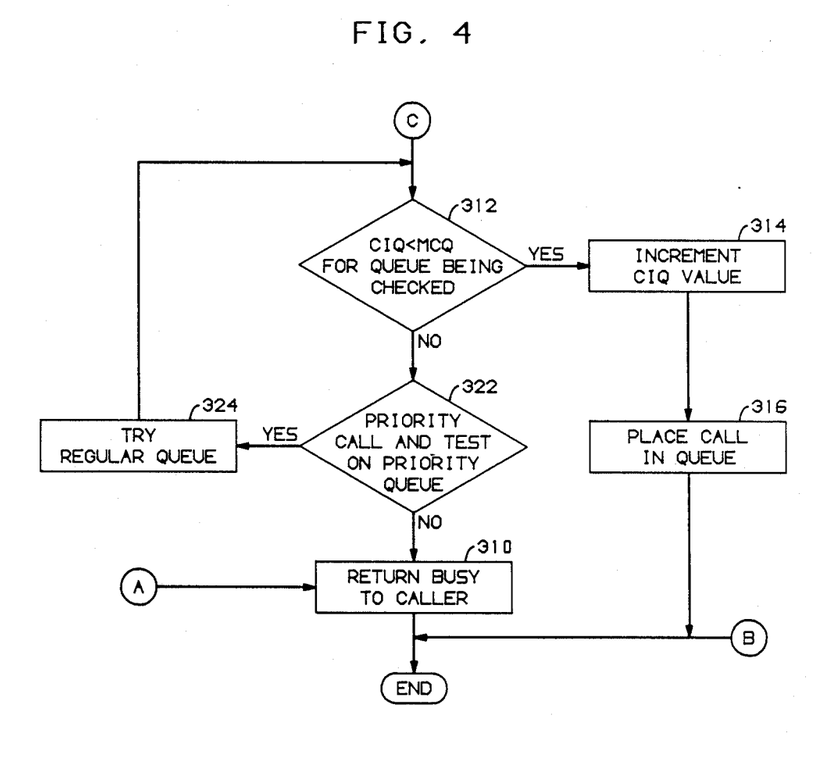

FIGS. 3 and 4 are flow charts of actions performed by the DSD/NCP in response to a call request message. The DSD/NCP receives the incoming call request message (action block 300, FIG. 3). It compares the calls in progress with the maximum calls allowed for all the locations specified for calls from a caller in that area code dialing that customer number. These specified locations are examined in the order specified by the selected sequence so that if several ACDs have fewer calls in progress than the maximum that the call can be routed to the ACD for which the call transport charge is lowest (action block 302). Next, test 304 checks whether the call in progress value is less than the maximum calls allowed value for any of the specified locations. If so, the call is routed to an available location and the calls in progress counter for that available location is incremented (action block 306). A routing message 160 is sent to the ACP 112 to route the call to that destination. If the result of test 304 is negative, then test 308 checks whether the customer allows calls of the type of this call to be queued. A particular customer may have several queues and if for a particular type of call, queuing is allowed, then the sequence specifies into which of these several queues a particular call origin/-type should be placed. If the result of test 308 is negative, i.e., if calls are not queued, then a busy signal is returned to the caller (action block 310, FIG. 4). This is accomplished by sending an appropriate message (not shown) to the ACP 112. If the result of test 308 is positive, then a check is made (test 309) whether the call is priority. If so, then the priority queue is first checked (action block 318); otherwise, the regular queue is checked (action block 320). A test 312 (FIG. 4) is made whether there is room in the queue being tested. There is room in the queue if the number of calls in queue (CIQ) is less than the maximum number of calls in the queue (MCQ). If the result of test 312 is negative, then test 322 checks whether this is both a priority call and the queue tested in test 312 is a priority queue. If the result of the test 322 is negative, then action block 310 to cause busy to be returned to the caller is executed. If there is room in the queue being tested in test 312, then the number of calls in the queue is incremented (action block 314) and the call is placed in the queue (action block 316). If the result of test 322 is positive, then action block 324 is executed leading to the test of the regular queue via test 312.

Figure 5:
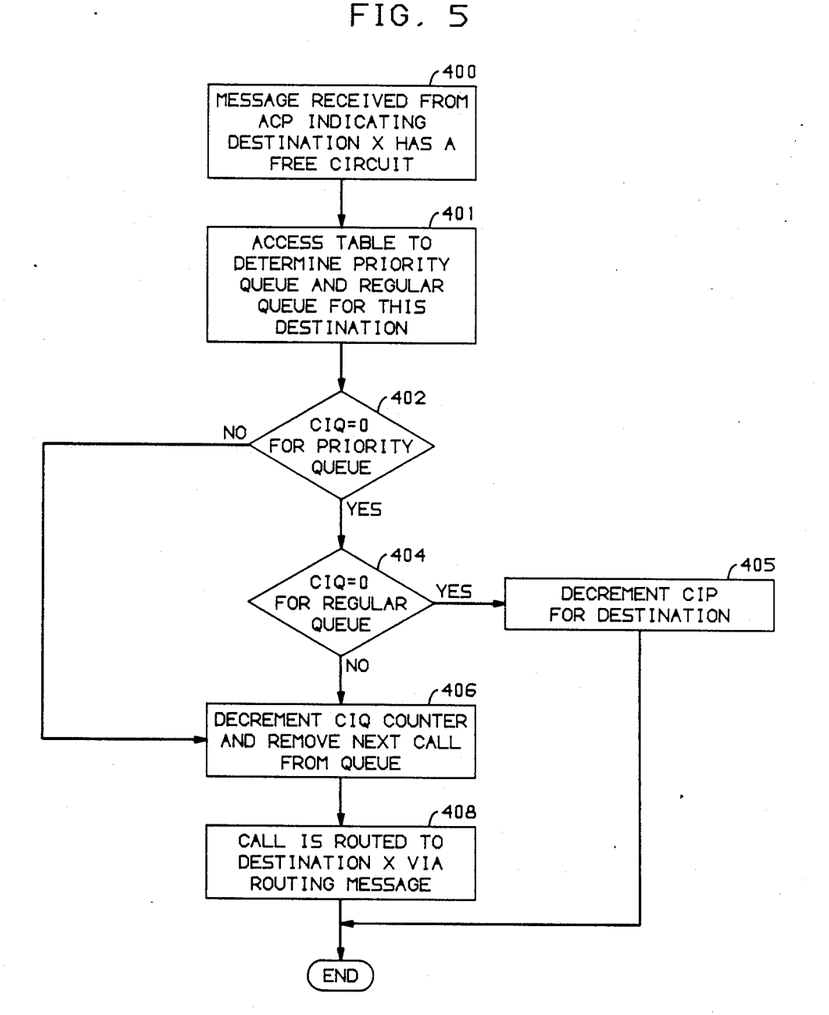

Subsequently, when an agent release message is received, then the queue or queues which contain calls for that ACD are checked whether there are any calls in these queue. FIG. 5 is a flow diagram of actions performed at the DSD/NCP in response to receiving an agent release report indicating that a circuit has become available (action block 400). Action block 401 accesses table 225 to determine the identity of the priority and regular queues for a given destination. First the priority queue is checked. Test 402 checks whether there are any calls in the queue for that ACD. If not (CIQ=0), then the regular queue is checked (test 404). If the regular queue is also empty, then the CIP counter for that destination is decremented (action block 405). If there are calls in either queue (CIQ≠0), then the CIQ counter for that queue is decremented and the next call is removed from the queue (action block 406). The call from the queue is then routed to the ACD from which the agent release report was received (location X) by sending a routing message 160 (action block 408) to ACP 112.

Priority queue 210 is checked first whenever an agent release message is received. If there are no calls in priority queue 210, then a regular queue 220 is examined to see if there are calls in that queue. In general, a priority queue is likely to be associated with all the destinations of the customer, while a regular queue may be associated with only a subset of these destinations, but it is also possible to associate a priority queue only with a subset. Priority queues are likely to be used for revenue producing traffic, such as caller product or service ordering traffic, or for special VIP numbers supplied to favored clients.

The sequence 240 indicates not only the sequence of destinations which are to be examined when an incoming call request is received, but also an indication of which queue, if any, the call is to be placed in if there is no available capacity at any of the destinations in the sequence. Here, it is possible to specify that a priority queue is to be used.

Figure 6:
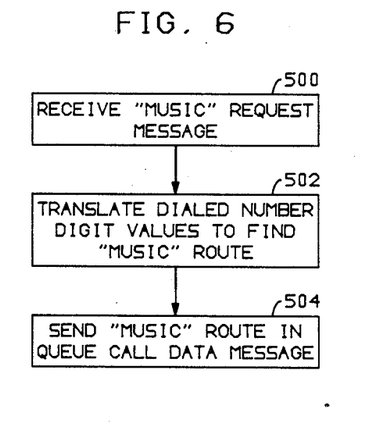

FIG. 6 is a flow chart of operations performed at DSD/NCP 120 for providing ACP 112 with the routing information needed to connect the selected type of music to the caller. DSD/NCP 120 receives a music request message 180 (action block 500). DSD/NCP 120 translates the number originally dialed by the caller plus the added digits dialed in response to an announcement to find the music route, using table 250 (action block 502). DSD/NCP 120 then sends a message 150, this time with the request indicator 156 unmarked, back to ACP 112 to connect the selected type of music to the caller (action block 504). Alternatively, music information can be stored in the ACP, either for each customer, or for groups of customers, or for all customers, and for each caller who subscribes to a preferred type of music, in all cases except the latter, the caller is prompted by an announcement to key a digit specifying the type of music to be returned while the caller is on hold.

While this description has been in terms of an automatic call distributor which is generally a sophisticated piece of equipment, the implementation is also applicable to agents directly connected to either an egress switch such as egress switch 104 or can be connected via a local exchange carrier. If the agents are directly connected, then queuing cannot be performed at the ACD and so must either be performed in the ACP 112 or in some other part of network 100 or the local exchange carrier. One of the advantages of this arrangement is that queuing can be performed at ACP 112 without in any way degrading service to the caller and without using resources in the rest of the PTN network.

While this description has been predominantly in terms of regional automatic call distributors, the more fundamental concept is that of a serving team and the sequencing is a sequencing among serving teams. Thus, for example, there might be one serving team which specializes in handling billing requests but can also take orders and another serving team which can only handle orders. Some of these teams might be located on the same premises. For this type of situation, if the order team were busy calls could be overflowed to the billing team at any location but not vice versa.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A method of completing calls from a caller to a destination customer served by a plurality of agent teams, comprising:
   accessing a database for obtaining data to route a call to first ones of said teams;
   determining whether a circuit to any of said first teams is available;
   upon determining that no circuit is available to any of said first teams, placing said routed call in a queue for second ones of said teams, said second ones of said teams being located in at least two geographically separated locations served by different communication switching systems; and
   upon subsequently determining that a circuit is available to one of said second teams, extending a call in said queue toward said determined available circuit;
   wherein said first ones and said second ones of said teams may be different groups of teams.

2. The method of claim 1 wherein said database is shared by a plurality of switching systems for routing calls toward agent teams of said destination customer.

3. The method of claim 2 wherein said database is accessed using a number dialed by said caller and an indication of the geographic source of said call.

4. The method of claim 2 wherein said queue is in said database.

5. The method of claim 4 wherein said database maintains circuit availability data for each of said first and said second teams.

6. The method of claim 5 wherein said database comprises:
   a plurality of queues for said destination customer; and
   wherein calls are entered into one of said plurality of queues according to said indication of geographic origin of said call or a type of said call or both.

7. The method of claim 6 wherein said type of said call is determined based on a number dialed by said caller.

8. The method of claim 6 wherein said type of said call is determined based on information supplied by said caller after the completion of dialing.

9. The method of claim 6 wherein one of said plurality of queues is a priority queue, wherein said call is entered in said priority queue if said type of said call is one of a class of priority calls, wherein the extending comprises:
   upon determining that a circuit is available to one of said second teams served by said priority queue, extending a call in said priority queue to said available circuit; and
   upon determining that a circuit is available to one of said second teams served by said priority queue and that no call is stored in said priority queue, extending a call in another queue serving said one of said second teams.

10. The method of claim 6 wherein said first teams are a proper subset of said plurality of agent teams.

11. The method of claim 6 wherein said determining comprises:
    determining whether a circuit to one of said first teams is available by checking teams of said first teams in a predetermined order.

12. The method of claim 1 wherein said extending comprises:
    sending a message from said database requesting a switching system to extend a call in said queue toward the available circuit.

13. The method of claim 1 further comprising the step of:
    prior to extending said call, connecting said caller to a source of music.

14. The method of claim 13 wherein said step of connecting said caller to said source of music comprises the steps of:
    returning an announcement requesting an indication of a preference of type of music to said caller;
    receiving from said caller an indication of a preferred request; and
    responsive to said indication, connecting a corresponding source or a preferred class of music to said caller.

15. The method of claim 14 wherein said connecting comprises:
    accessing said database to determine an identification of said preferred class of music.

16. A method of completing a call from a caller to a destination customer served by at least one agent team, comprising:
    accessing a database for obtaining data to route the call to one of said at least one teams of the destination customer;
    determining whether a circuit to one of the at least one teams is available;

if no circuit to one of the at least one teams is available, placing the call on hold while waiting for the availability of a circuit to one of the at least one teams;

returning an announcement requesting an indication of a preference of type of music to said caller;

receiving from said caller an indication of the preferred request; and responsive to said indication, connecting said preferred type of music to said caller.

17. The method of claim 16 wherein said connecting of music comprises:

accessing a database to determine the identification of said preferred type of music.

18. Database means comprising:

a plurality of queues;

means for maintaining circuit availability data for a plurality of agent teams;

means, responsive to a request message from a switching system for routing data for a call to a destination, for identifying a first plurality of agent teams for serving said call, for determining whether any of said first plurality has an available circuit, and for placing said call in a queue for a second plurality of agent teams if none of said first plurality has an available circuit; said second ones of said teams being located in at least two geographically separated locations served by different communication switching systems; and means responsive to receipt of a disconnect message making a circuit of a specific one of said plurality of agent teams available, sending a routing message to said switching system to route a call in the queue to said specific agent team.

19. A method of completing a call from a caller to a destination customer served by a plurality of agent teams comprising:

accessing a database shared by a plurality of switching systems, using a number dialed by said caller and an indication of the geographic source of a call to access said database, for obtaining data to route the call to one of a first plurality of the teams of the destination customer;

in said database, determining whether a circuit to any of the first plurality of teams is available by checking circuit availability data of said first teams in a predetermined order;

if no circuits are available in any of the first teams, placing the call in a queue of said database for a second plurality of teams of the destination customer; said second ones of said teams being located in at least two geographically separated locations served by different communication switching systems; and when a circuit becomes available for one of the second plurality of teams, sending a routing message to one of said switching systems to extend a call in the queue toward a circuit of the team having the available circuit;

wherein said first and said second plurality may contain different agent teams;

wherein said database comprises a plurality of queues for said destination customer and wherein calls are entered into one of said plurality of queues, according to said indication of geographic source of a call or a type of said call or both, and wherein said type of said call is determined based on a number dialed by said caller or by information supplied by said caller after the completion of dialing;

wherein one of said plurality of queues is a priority queue, wherein said call is entered in said priority queue if said type of class is one of a class of priority calls, and wherein calls from said priority queue are extended to an available circuit of a team served by the priority queue before calls from another queue are extended to said available circuit.

20. A method of completing a call from a caller over a public switched network to a destination customer served by at least one agent team, comprising:

determining that no circuits are available for completing the call to said destination customer;

returning an announcement from the public switched network requesting an indication of a preference of type of music to said caller;

responsive to receiving an indication of a preference from said caller, connecting said preferred type of music to said caller.

21. The method of claim 20 wherein said connecting of music comprises:

accessing a database to determine the identification of said preferred type of music.

22. A method of completing a call from a caller over a public switched network to a destination customer served by at least one agent team, comprising:

determining that no circuits are available for completing the call to said destination customer;

connecting a type of music, prespecified by said caller, to said caller.

23. The method of claim 22 further comprising:

storing for said caller an indication of said prespecified type of music.

* * * * *